United States Patent [19]

Harrell

[11] 4,391,922
[45] Jul. 5, 1983

[54] BLOWING AGENTS AS CURATIVES FOR ETHYLENE/CARBON MONOXIDE COPOLYMERS

[75] Inventor: Jerald R. Harrell, Wilmington, Del.

[73] Assignee: E. I. Du Pont de Nemours and Company, Wilmington, Del.

[21] Appl. No.: 375,467

[22] Filed: May 6, 1982

[51] Int. Cl.$^3$ ............................................... C08J 9/10
[52] U.S. Cl. .................................... 521/88; 521/89; 521/92; 521/93; 521/94; 521/95; 521/134; 521/189; 525/190
[58] Field of Search .................. 521/95, 189, 88, 89, 521/92, 93, 134

[56] References Cited

U.S. PATENT DOCUMENTS

| | | |
|---|---|---|
| 2,387,730 | 10/1945 | Alderson, Jr. ........................ 260/94 |
| 2,495,286 | 1/1950 | Brubaker et al. . |
| 2,833,740 | 5/1958 | Verbanc . |
| 2,839,478 | 6/1958 | Wilms et al. . |
| 3,282,864 | 11/1966 | Bost et al. ............................. 521/90 |
| 3,428,583 | 2/1969 | Lasman ................................ 521/95 |
| 3,780,140 | 12/1973 | Hammer . |
| 3,846,350 | 11/1974 | Schentger ............................. 521/95 |

FOREIGN PATENT DOCUMENTS

| | | |
|---|---|---|
| 1459666 | 12/1976 | United Kingdom . |
| 2009183 | 6/1979 | United Kingdom ................ 521/95 |

*Primary Examiner*—Morton Foelak

[57] ABSTRACT

Mono- and polyazoformamide, sulfonyl hydrazide, sulfonyl semicarbazide and/or dinitrosomethylene amine compounds act as chemical blowing agents and curatives for carbon monoxide-containing ethylene copolymers.

10 Claims, No Drawings

BLOWING AGENTS AS CURATIVES FOR ETHYLENE/CARBON MONOXIDE COPOLYMERS

BACKGROUND OF THE INVENTION

The subject invention relates to chemical blowing agents which also act as curatives for ethylene/carbon monoxide copolymers in the formation of closed cell microcellular articles.

It is well known in the art that heating a composition containing an ethylene based copolymer, a chemical crosslinking agent and a chemical blowing agent in a pressurized mold will crosslink the copolymer and decompose the blowing agent so that on opening the mold the composition expands into a closed cell microcellular foam. Articles such as flat shoe soles, foamed matting and recreation vehicle fenders are manufactured in this way.

During the molding process, the composition reaches a suitable degree of cure before the pressure is released and the mold opened. If the mold is opened before the necessary degree of cure is reached, the polymer network is not strong enough to contain the gaseous blowing agent and the article collapses as the gas escapes from the molten mass.

Combination chemical blowing and curing agents have heretofore also been disclosed in the art. For example, U.S. Pat. No. 3,428,583 discloses use of polyazo compounds to both cure and blow polyolefin resins; U.S. Pat. No. 3,846,350 discloses use of azodicarbonamide as a combination blowing agent and cure accelerator for polychloroprene rubber; U.S. Pat. No. 3,282,864 discloses use of cycloalkane di(sulfonyl azide) compounds to both cure and foam hydrocarbon polymers such as polyethylene, polypropylene and blends thereof; and Great Britain No. 2,009,183A discloses certain azo esters which can function as both blowing and crosslinking agents for polyvinyl chloride, ethylene copolymers, diene rubbers and poly(vinyl chloride) at temperatures greater than about 170° C.

SUMMARY OF THE INVENTION

The subject invention provides for the curing and blowing of carbon monoxide-containing ethylene copolymers using mono- and polyazoformamide. sulfonyl hydrazide, sulfonyl semicarbazide, and/or dinitrosomethyleneamine compounds.

More specifically, one embodiment of the subject invention is a foamable composition comprising a copolymer having a melt index of 0.1 to 500 of ethylene and about 1 to 25 weight percent carbon monoxide based on the copolymer; and 2 to 20 weight percent of a blowing agent curative selected from the group consisting of mono- and polyazoformamide compounds, sulfonyl hydrazide compounds, sulfonyl semicarbazide compounds and dinitrosomethyleneamine compounds.

In another embodiment of the subject invention, the carbon monoxide-containing copolymers have copolymerized therewith up to 75 weight percent of a softening monomer selected from the group consisting of alkyl acrylates and methacrylates having linear or branched alkyl groups of 1 to 18 carbon atoms, vinyl esters of saturated carboxylic acids having 1 to 18 carbon atoms and vinyl alkyl ether wherein the alkyl group contains 1 to 18 carbon atoms. Also provided are the closed cell microcellular articles produced by blowing and curing these compositions.

DETAILED DESCRIPTION

Ethylene based copolymer foamable compositions of the prior art have heretofore generally required the presence of a chemical blowing agent and a separate curing agent in the manufacture of closed cell microcellular articles. Surprisingly, it has now been discovered that carbon monoxide-containing ethylene copolymers can be both blown and cured using a member of the group consisting of mono- and polyazoformamide, sulfonyl hydrazide, sulfonyl semicarbazide and dinitrosomethyleneamine compounds.

In one embodiment of the subject invention, the copolymers to be blown and cured have a melt index of about 0.1 to 500 and are comprised of ethylene and about 1 to 25 weight percent carbon monoxide based on the copolymer. More preferably, these copolymers have a melt index of 1 to 50, and a carbon monoxide content of 1 to 10 weight percent. Unless otherwise specified, all weight percents herein are based upon the weight of the ethylene based copolymer. These copolymers and their preparation are more fully detailed in U.S. Pat. No. 2,495,286, herein incorporated by reference.

In another embodiment of the subject invention, the carbon monoxide-containing copolymers have copolymerized therewith up to 75 weight percent of a softening comonomer. These copolymers have a melt index of about 0.1 to 500, more preferably 1 to 50. The softening comonomers, well known in the art, are those alkyl acrylates and methacrylates having linear or branched alkyl groups of 1 to 18 carbon atoms, vinyl esters of saturated carboxylic acids having 1 to 18 carbon atoms and vinyl alkyl ethers wherein the alkyl group contains 1 to 18 carbon atoms. Preferably, the softening monomer is selected from the group consisting of vinyl acetate, methyl acrylate and butyl acrylate. These copolymers and their preparation are more fully described in U.S. Pat. No. 3,780,140, herein incorporated by reference.

In addition to, and intimately mixed with, the carbonmonoxide containing ethylene based copolymers, the foamable compositions of the subject invention contain about 2 to 20 weight percent of a combination blowing agent curative selected from the group consisting of mono- and polyazoformamide compounds, e.g. azodicarbonamide, sulfonyl hydrazide compounds, e.g. p-toluene sulfonyl hydrazide and p,p'oxybis(benzene sulfonyl hydrazide), sulfonyl semicarbazide compounds, e.g. p-toluene sulfonyl semicarbazide and dinitrosomethyleneamine compounds, e.g. N,N'-dinitrosopentamethylene tetramine. Combinations of any of these compounds, of course, may also be used. When using the more active blowing agent curatives of the subject invention, for example, p,p'-oxybis(benzene sulfonyl hydrazide) or N,N'-dinitrosopentamethylene tetramine the carbon monoxide content of the copolymer to be cured should be less than about 10 percent based on the weight of the copolymer in order to allow an adequate degree of blowing to take place before complete cure occurs.

Although not essential components of the composition of the subject invention, a number of additional ingredients are generally mixed into the foamable composition in commercial operations. Exemplary of these are mineral fillers such as silica or clay and carbon black used to reduce the cost of the finished article and to provide strength, up to 50 weight percent of unsaturated polymers such as natural rubber and other polymers such as polyethylene, polyvinyl chloride, ethylene-vinyl acetate copolymers and ethylene-methylacrylate copolymers to reduce the cost of the end product, activators such as zinc oxide, zinc stearate, urea, diethylene glycol and pentaerythritol, plasticizers such as monoesters, polyesters, monoethers, monoetheresters and hydrocarbon process oils, colorants and suitable mold lubricants. When other polymers are to be added to the foamable compositions of the subject invention, the weight percent blowing agent curative required in the composition should be based on the total weight of polymers in the composition.

In the foaming process, the composition is first intimately mixed in the molten state in a conventional mixer such as a Banbury mixer, two roll mill or a combination of the two, or an extruder. It is essential that the mixing temperature be kept below the decomposition temperature of the blowing agent curative.

After mixing, the composition is placed in a hot compression mold and the platen pressure thereon raised to a pressure sufficient to contain the product in the mold, generally greater than bout 20 MPa. The molds used are bevelled outward toward the top of the mold so that, upon completion of the foaming process, the closed cell microcellular article rises easily out of the mold. Upon pressurization, the blowing agent curative decomposes to produce small nitrogen bubbles throughout the composition. The melt generally need be held in the mold under pressure for between 3 and 30 minutes to allow complete curing and blowing to occur.

Alternatively, a conventional continuous sponge process can be used whereby the molten mixture is extruded onto a continuous belt and conveyed through a hot air curing tunnel. Occasionally, the surface of these foamed articles may be roughened during these conventional continuous sponge processes. To alleviate this surface roughening, small amounts of conventional curing agents can be added to the foamable composition prior to the blowing and curing step. Other continuous curing means such as liquid curing mediums and microwave ovens can also be used.

The closed cell microcellular articles which result from blowing and curing the foamable compositions of the subject invention include ethylene/1-25% carbon monoxide, and ethylene/1-25% carbon monoxide/1-75% softening monomer foams having a bulk density of between about 30 and 600 kg-m$^3$, of which those based on ethylene/1-25% carbon monoxide/between 40 and 75 weight percent softening monomer are preferred for certain end uses where a minimum compressive deformation resistance is desirable, these foams generally having a bulk density of 30 to 300 kg-m$^3$.

The advantages of the foamable compositions of the subject invention will become more apparent with reference to the examples that follow.

EXAMPLE I

Ethylene/25% vinyl acetate/10% carbon monoxide terpolymer (melt index 35, ASTM-D1238 condition E) was mixed with 50 weight percent (unless otherwise specified, weight percents herein are based on ethylene based copolymer) carbon black ("Sterling"NS, N-774, Cabot Corporation) and 2 weight percent stearic acid in a Banbury OOC internal mixer. When the temperature reached about 80° C., the batch was sheeted out on a two roll mill and 2 weight percent each of zinc oxide, zinc stearate and calcium oxide ("Desical" P, Basic Chemicals), and 5 weight percent azodicarbonamide ("Celogen" AZ-130, Uniroyal Chemicals) were added. The compound was sheeted off the mill at a thickness of about 0.36 cm. 7.6×7.6 cm (3"×3") squares were then died out of the sheets and two such squares loaded into a 0.6 cm (¼") thick stainless steel beveled-edge frame mold placed between two stainless steel plates. The beveled cavity of the frame mold measured 7.6×7.6 cm (3"×3") on one face and 8×8 cm (3¼"×3¼") on the other. The outside dimensions of the frame were 20×20 cm (8"×8"). Before loading, the mold assembly was preheated in a hydraulic press at 177° C. After charging the compound, the filled mold assembly was placed between the 20×20 cm platens of a Pasadena Hydraulic's press, set at 177° C. The mold assembly was pressured to 241 to 275 MPa (35,000–40,000psi) platen force as indicated by the pressure gauge of the press. When the pressure was completely released 3 minutes later the compound expanded into a sponge slab measuring, on the small face, approximately 11×11×1.1 cm. The sponge had a fine cell structure and a density of 256 kg/m$^3$ (16 lbs./ft.$^3$). The density was calculated using the weight and thickness measurements of a 5×5 cm sample died from the center of the sample. Using 5 and 10 minute press times, under the same conditions, the compound yielded good sponge having densities of 266 kg/m$^3$ (16.6 lbs./ft.$^3$) and 364 kg/m$^3$ (22.7 lbs./ft.$^3$) respectively.

EXAMPLE II

In this example, the ethylene based polymers to be cured and foamed were as follows:
Batch A: E/25% vinyl acetate/10% CO (M.I. 35)
Batch B: E/17% CO (M.I. 140)
Comparative Batch C: E/25% vinyl acetate (M.I. 2)

The following ingredients were mixed with these ethylene based polymers, percentages being based on weight of the polymer, in accordance with the procedure of Example I except that the Banbury mixture here was dumped at 100°–105° C.:

|  | Batch A | Batch B | Batch C |
|---|---|---|---|
| CaCO$_3$[1] | 30% | 30% | — |
| Carbon Black[2] | — | — | 30% |
| Stearic Acid | 2% | 2% | 2% |
| Zinc Oxide | 2% | 2% | 2% |
| Zinc Stearate | 2% | 2% | 2% |
| Azodicarbonamide[3] | 5% | 5% | 5% |

[1]"Atomite Whiting", Thomson Weinman & Company.
[2]"Sterling" NS.
[3]"Celogen" AZ 130.

The compounds were cured and blown in accorance with the procedure of Example I, the cure time/temperature and resulting properties shown below:

|  | Cure Time/Temp. (min./°C.) | Density (kg/m$^3$) |
|---|---|---|
| Batch A | 3/177 | 201 |
| Batch B | 4/177 | 189 |
| Batch C | 10/177 | No sponge formed; molten mass that had to be scraped off of the |

-continued

| Cure Time/Temp. (min./°C.) | Density (kg/m³) |
|---|---|
| mold. | |

EXAMPLE III

In this example, the ethylene based polymers to be cured and foamed were as follows (M.I. 20-40):
Batch A: E/26% vinyl acetate/3% CO
Batch B: E/25% vinyl acetate/10% CO
Batch C: E/24% vinyl acetate/1% CO
Batch D: E/24% vinyl acetate/1% CO
Batch E: E/26% vinyl acetate/9% CO
Batch F: E/24% vinyl acetate/1% CO
Batch G: E/26% vinyl acetate/9% CO The following ingredients were mixed with these ethylene based polymers percentages based on weight of the polymer, in accordance with the procedure of Example I:

|  | Batch A | Batch B | Batch C | Batch D | Batch E | Batch F | Batch G |
|---|---|---|---|---|---|---|---|
| Carbon Black | 30% | 30% | 30% | 30% | 30% | 30% | 30% |
| Stearic Acid | 0.5% | 1.2% | 2% | 2% | 2% | 2% | 2% |
| N,N'-dinitrosopenta-methylene tetramine[1] | 6.9% | — | — | — | — | — | — |
| Urea | 4.5% | — | — | — | — | — | — |
| Zinc Oxide | — | 2% | — | — | — | 2% | — |
| Zinc Stearate | — | 2% | — | — | — | 2% | — |
| p-toluene sulfonyl semicarbazide[2] | — | 10% | — | — | — | — | — |
| p,p'-oxybis(benzene sulfonyl hydrazide)[3] | — | — | 10% | — | — | — | — |
| p-toluene sulfonyl hydrazide[4] | — | — | — | 10% | 5% | — | — |
| Azodicarbonamide[5] | — | — | — | — | 2.5% | 20% | 2.5 |

[1]"Unicel" 100, E. I. du Pont de Nemours and Company.
[2]"Celogen" RA
[3]"Celogen" OT
[4]"Celogen" TSH
[5]"Celogen" AZ 130

Batch A & B were cured and blown in accordance with the procedure of Example I, as were Batch C-F, however, in these latter cases, a 4 cavity mold having approximately 30.5×30.5 cm outside dimensions were used. This mold was heated using a Bolling hydraulic press at 979 kN ram force; the press platens measured about 61×61 cm with a 41 cm diameter ram. The cure times/temperatures and resulting densities are shown below:

|  | Cure Time/Temp. (min./°C.) | Density (kg/m³) |
|---|---|---|
| Batch A | 30/166 | 69 |
| Batch B | 8/177 | 170 |
| Batch C | 10/160 | 107 |
| Batch D | 10/160 | 235 |
| Batch E | 10/177 | 239 |
| Batch F | 15/160 | 37 |
| Batch G | 7/204 | 311 |

EXAMPLE IV

The polymers cured and blown in this example, E/X/CO, cover a wide range of CO and X contents where X=vinyl acetate, methyl acrylate or n-butyl acrylate as shown below.

The compounds were prepared in accordance with the procedure of Example I and the data given in the Table below, however, the 4 cavity mold described in Example III was used. The compositions, cure times/temperatures and resulting densities shown below:

|  | A | B | C | D | E | F | G |
|---|---|---|---|---|---|---|---|
| E/31% VA/1% CO (MI = 51) | 100% | — | — | — | — | — | — |
| E/20% VA/2% CO (MI = 3) | — | 100% | — | — | — | — | — |
| E/51% MA/6% CO (MI = 3) | — | — | 100% | — | — | — | — |
| E/23% VA/5% CO (MI = 31) | — | — | — | 100% | — | — | — |
| E/40% MA/22% CO (MI = 0.3) | — | — | — | — | 100% | — | — |
| E/76% MA/6% CO (MI = 5) | — | — | — | — | — | 100% | — |
| E/30% n-BA/10% CO (MI = 5) | — | — | — | — | — | — | 100% |
| Stearic Acid | 2% | 2% | — | — | — | 2% | 2% |
| Carbon Black | 30% | 30% | 30% | 30% | 30% | 30% | 30% |
| Zinc Oxide | 2% | 2% | 2% | 2% | 2% | 2% | 2% |
| Zinc Stearate | 2% | 2% | 2% | 2% | 2% | 2% | 2% |
| Azodicarbonamide | 5% | 5% | 5% | 5% | 5% | 5% | 5% |

| Sample No. | Cure Time/Temp. min./°C. | Density kg/m³ |
|---|---|---|
| A | 15/177 | 142 |
| B | 10/177 | 84 |

|   | 15/160 | 84 |
|---|---|---|
| C | 10/177 | 136 |
| D | 10/177 | 91 |
| E | 3/177 | 312 |
|   | 12/150 | 453 |
| F | 40/177 | 115 |
| G | 10/177 | 312 |

EXAMPLE V

The composition cured and blown in this example was as follows (% based on total polymer):

| E/24% vinyl acetate/3.0% CO (MI = 23) | (80 weight parts) |
|---|---|
| E/18% vinyl acetate (MI = 2.5) | (20 weight parts) |
| Carbon Black | 24% |
| Stearic Acid | 1.6% |
| ZnO | 1.6% |
| Zn Stearate | 1.6% |
| Azodicarbonamide | 4% |

The E/VA/CO, carbon black and stearic acid were mixed in a Banbury mixer as per Example I and sheeted out at about 100° C. The remaining components were then added on a two roll mill. The resulting composition was cured and blown as per Batches C-F of Example III. The cure times/temperature was 5 min/177° C. and the density was 108 kg/m$^3$.

I claim:

1. A foamable composition comprising
   (a) a copolymer having a melt index of 0.1 to 500 of (i) ethylene (ii) about 1 to 25 weight percent carbon monoxide based on the copolymer (iii) 1 to 75 weight percent based on the copolymer, of a softening monomer selected from the group consisting of alkyl acrylates and methacrylates having linear or branched alkyl groups of 1 to 18 carbon atoms, vinyl esters of saturated carboxylic acids having 1 to 18 carbon atoms and vinyl alkyl esters wherein the alkyl group contains 1 to 18 carbon atoms; and
   (b) 2 to 20 weight percent based on the copolymer of a blowing agent curative selected from the group consisting of mono- and polyazoformamide compounds, sulfonyl hydrazide compounds, sulfonyl semicarbazide compounds and dinitrosomethyleneamine compounds.

2. The foamable composition of claim 1 wherein the blowing agent curative is azodicarbonamide.

3. The foamable composition of claim 1 wherein the blowing agent curative is p-toluene sulfonyl hydrazide.

4. The foamable composition of claim 1 wherein the blowing agent curative is p,p'-oxybis(benzene sulfonyl hydrazide).

5. The foamable composition of claim 1 wherein the blowing agent curative is p-toluene sulfonyl semicarbazide.

6. The foamable composition of claim 1 wherein the blowing agent curative is N,N'-dinitrosopentamethylene tetramine.

7. The composition of claim 1 wherein is present an activator selected from the group consisting of zinc oxide, zinc stearate, pentaerythritol, urea and diethylene glycol.

8. The composition of claim 2 wherein the softening monomer is selected from the group consisting of vinyl acetate, methyl acrylate and butyl acrylate.

9. The composition of claim 1 wherein exists a member of the group consisting of carbon black, mineral fillers and plasticizers.

10. The composition of claim 1 wherein is blended up to 50 weight percent, based on total composition, of a member of the group consisting of unsaturated polymers, polyethylene, polyvinyl chloride, ethylene-vinyl acetate copolymer and ethylene-methacrylate copolymer.

* * * * *

UNITED STATES PATENT OFFICE
CERTIFICATE OF CORRECTION

PATENT NO. : 4,391,922
DATED : July 5, 1983
INVENTOR(S) : Jerald R. Harrell

It is certified that error appears in the above-identified patent and that said Letters Patent are hereby corrected as shown below:

Column 7, line 41 "esters" should be --ethers--

Column 8, line 32 "2" should be --1--

Signed and Sealed this

Twentieth Day of December 1983

[SEAL]

*Attest:*

GERALD J. MOSSINGHOFF

*Attesting Officer*     *Commissioner of Patents and Trademarks*